United States Patent [19]

Lamothe

[11] Patent Number: 5,006,257

[45] Date of Patent: Apr. 9, 1991

[54] EXTRACTS OF THERMAL WATERS AND THEIR APPLICATIONS

[76] Inventor: Andre Lamothe, Plateu de Beauregard - Les Pinchinats, 13100 Aix-en-Provence, France

[21] Appl. No.: 264,947

[22] PCT Filed: Jan. 21, 1988

[86] PCT No.: PCT/FR88/00031

§ 371 Date: Sep. 20, 1988

§ 102(e) Date: Sep. 20, 1988

[87] PCT Pub. No.: WO88/05424

PCT Pub. Date: Jul. 28, 1988

[30] Foreign Application Priority Data

Jan. 21, 1987 [FR] France ............................. 87 00646

[51] Int. Cl.$^5$ ................................................ C02F 9/00
[52] U.S. Cl. ..................................... 210/650; 210/652; 210/787; 210/806
[58] Field of Search ............... 210/774, 900, 790, 806, 210/805, 650, 652, 787, 748; 405/303

[56] References Cited

U.S. PATENT DOCUMENTS 4,222,825  9/1980  Eisden ................................. 203/11
4,334,788  6/1982  Miner .................................. 366/303
4,804,478  2/1989  Tamir .................................. 210/169

FOREIGN PATENT DOCUMENTS 2615222  10/1977  Fed. Rep. of Germany .

*Primary Examiner*—Ivars Cintins
*Attorney, Agent, or Firm*—Darby & Darby

[57] ABSTRACT

A process of regenerating polluted thermal swimming pool waters is disclosed. The process includes making a condensate of pure thermal water by concentration of the thermal plankton by means of known physical processes: filtering the polluted thermal water and then sterilizing it; regenerating the sterilized thermal water by adding condensate thereto in sufficient proportion to restore the natural population of thermal plankton.

5 Claims, No Drawings

EXTRACTS OF THERMAL WATERS AND THEIR APPLICATIONS

The present invention relates to thermal waters and muds and more particularly to problems of a sanitary nature posed by their use in public places.

Thermal waters have special chemical and bacteriological compositions. Each type of thermal water contains active anions and cations in the form of dissolved salts or as gases, and some waters contain living agents in the form of aerobic and anaerobic microorganisms commonly called "thermal plankton." These microorganisms are more particularly the bacteria of sulfur, of iron, and the cyanobacteria.

Thermal muds are the component:
of a solid base formed by an amalgam of various elements (colloids, peat, silica, etc.) constituting a "natural occurrence of thermal mud" or simply formed by natural clays generally extracted outside the site,
and of thermal water containing these active agents(,) cations and anions specific for each type of water, and these microorganisms themselves.

The curative properties of thermal waters and muds have been known from highest antiquity and in particular since the Roman civilization.

It is known practice to make patients undergo thermal cures during which they drink thermal water, take showers or baths in thermal water, or receive applications of thermal muds.

In particular it is known practice to let the patients take baths in swimming pools filled with thermal water. But in this case the water of the swimming pool is inevitably polluted by the bathers and becomes charged with dangerous germs such as coliform bacilli, streptococci, staphylococci, clostridium(,) sulfite reducing agents and others.

When the thermal springs have a very heavy flow, it is possible to reduce this pollution by evacuation of the water so that the swimming pool is practically a basin of running water; but this is not always the case so that the volumes available for renewal of the water are not sufficient to ensure satisfactory evacuation of the dangerous germs.

It is indispensable, therefore, to resort to processes of sterilization of swimming pool water which can only be physical processes as the chemical ones such as chlorination, ozonization, would transform the initial chemical composition of the thermal water and by their long-lasting sterilization effect would destroy the living elements possibly reintroduced at end of cycle. The sterilization processes that can be used are filtration, heat, ultraviolet rays, etc. What is then obtained is water clean from the sanitary point of view but which is "dead water" having practically lost all its curative properties of thermal water, notably because the thermal plankton has been killed.

The problem is the same with respect to muds: In contact with the patient's body the mud becomes laden with more or less infectious bacteria and with germs.

For local applications the quantities of mud used are small and one can, without major disadvantage, not re-use the mud that has served for an application. But in this case of treatment by immersion, that is, of what is called mud baths, the quantities of mud taken are such that they cannot be replaced after each use. Hence they must be recycled.

It is then imperative to free them of their germs and harmful bacteria, that is, in fact, to sterilize them and in this case also one risks destroying most of their curative properties.

The object of the present invention is a process consisting in regenerating sterilized thermal waters and muds by means of thermal water extract and it covers also by way of new industrial product the thermal water extract permitting to carry out such a regeneration.

This extract is obtained by concentration of the thermal water so as to eliminate a large quantity of water (in fact, the greatest quantity possible) and preserving only the living elements that constitute the thermal plankton. This elimination of water is obtained by any known means such as centrifugation, microfiltration, reverse osmosis.

As an example, it is possible by centrifugation to obtain from 2 cubic meters of water $\frac{1}{4}$ liter of extract.

The most complete process tested is that of centrifugation for it permits concentrating almost all of the large molecules and moreover trapping the gases dissolved in the water. These gases are collected to be reinjected at end of sterilization cycle into the thermal water or mud or to serve to nourish the extract obtained so as to ensure its maturation (maturation is called a development of the bacterial germs which are in the natural state in the thermal water, each of these germs having its specific growth nutrition).

Once this extract is obtained and the dissolved gases are recovered, it is possible to regenerate in a continuous cycle the water and mud of collective or individual baths, then to reactivate them and after sterilization to reintroduce the living active elements contained in the concentrate as well as the gases.

With respect to the thermal waters, one proceeds as follows:
Firstly they are filtered with the usual swimming pool filters such as sand filter, diatomaceous filter or others to retain the coarse impurities;
then the water is sterilized either by microfiltration, or by the process of rapid heating to high temperature called "flash pasteurization" or by ultraviolet (rays);
the sterile, hence "dead", water thus obtained is then regenerated by addition of the condensate of thermal water described before.

Hence this process permits:
extracting in the form of a concentrate perfectly storable away from air or under inert atmosphere most of the bacteria constituting the thermal plankton, and this 24 hours a day and 365 days a year;
extracting most of the gases originally dissolved in the thermal water and storing them.

On the basis thereof, to devise a regeneration of the collective baths to thermal water using, by recycling, significant volumes of regeneration compatible with health legislation while fully preserving the active properties of the water as far as particularly the plankton and the gases are concerned, either to a concentration equal to that of the original water or higher if that is desired.

By way of example:
If the legislation, presently under study, demands a maximum hourly renewal of the total content of the collective swimming pool or 100 m$^3$ per hour, few thermal stations in France could satisfy this rule at least in the spirit of integral conservation of the active properties of a thermal water.

By the process claimed, a thermal station which would have available a total hourly flow of 40 m$^3$ of thermal water of which, in view of the other treatments performed, a flow of 20 m³ per hour for filling the collective swimming pool or pools, could thus store as concentrate the annual equivalent of 20 m³/h×24×365=175,200 m³, plus 20 m³/h×16×36=116,800 m³ representing the water not used in the other treatments outside of the eight hours that the station is open (24−8=16) or a total of 292,000 m³ in a minimum volume of concentrate of 35.5 m³ (2 m³ of thermal water for ¼ liter of concentrate).

If the accepted renewal of collective swimming pools is 100 m³ per hour, the station has 2,920 hours of swimming pool use that it can distribute to best advantage depending on the attendance.

If the high season from May to November, or 6 months, represents 70% of the total attendance for the year, the station will have a potential of collective baths during high season of 2,044 hours or as an average 340 hours per month. This is to be compared with the potential of a station during the peak period having 20 m³ (per) hour of thermal water available for the swimming pools and a storage capacity of this quantity over 24 hours plus that of the water available outside the other services, namely:

20 m³/h×24=408 plus 20 m³/h×16=320 that is, a total of 728 m³ per day.

For a same renewal flow of the swimming pools of 100 m³ per hour, the station has a daily potential of 7.28 hours (of) operation or 189 hours per month (7.28×26).

The process claimed gives under these conditions a minimum annual productivity gain of 80%.

It requires only little storage.

It permits recycling a portion of the thermal water on itself by preserving its active properties.

It permits distributing the potential better according to the attendance of the thermal station.

With an obligation to permanently recycle 100 m³/h, it permits letting two collective swimming pools of a capacity of 100 m³ each take turns during peak periods for 8 hours a day for a spring flow of 20 m³/h.

If the overall balance of concentrate obtained permits, it permits making baths superactivated in thermal plankton.

It permits making a separate maturation of the thermal concentrate and reinjecting the latter into the regeneration cycle.

With respect to the thermal muds, one proceeds as follows:

The mud which comes out of the swimming pools or individual baths is sifted through vibratory screens for example in order to retain the coarse impurities. Then it is sterilized by physical means—a heat process like the "flash pasteurization" or possibly a process of electronic bombardment.

Then it is reconditioned:

First of all in active chemical elements originating from the anions and cations constituting the salts dissolved in the thermal water and mainly those originating from the oligo elements. For this, a significant portion of the interstitial thermal water used will be eliminated in the course of the cycle (1 to 2 minimum) and replaced by an equivalent contribution of new thermal water laden with active elements. The elimination of the interstitial water will take place in part by the heat method if that form of sterilization is chosen, by centrifugation or both combined, by simple decantation in the storage vats of used muds. All these methods are supplemented by the permanent replacement of the muds lost during the treatments.

Then by addition of the thermal plankton concentrate, either in the same proportions as those of the original mud, or in higher proportions to make superactivated muds, or, if desired, for a plankton concentrate having undergone an appropriate maturation.

Its reconditioning will be completed by the addition of the gases extracted during the phase of concentrate production.

Under the present invention the thermal water concentrate can also be used for adding it to normal water in order to obtain a water which, without actually being thermal water, has a population of thermal plankton which is very close to it. In fact, in a bathtub filled with normal water there may be added a quantity of concentrate sufficient to recreate conditions close to those of a thermal water. By this means it will thus be possible to use the active properties of a plankton concentrate outside a thermal station by using it at home for example in a bathtub, jacuzzi, spa.

I claim:

1. A process for regenerating polluted thermal waters containing thermal liquid with living thermal plankton therein, comprising the steps:
    (a) providing a first portion of pure, unused thermal waters containing thermal liquid and living thermal plankton therein;
    (b) obtaining a thermal plankton concentrate of said first portion of thermal waters by separating a quantity of thermal liquid from said first portion of thermal waters;
    (c) filtering and sterilizing a second portion of thermal waters, said second portion being polluted; and
    (d) regenerating said sterilized thermal waters by adding to it said thermal plankton concentrate in an amount sufficient to provide a predetermined population of living thermal plankton in said sterilized thermal waters.

2. The process of claim 1, further comprising the steps of collecting dissolved gasses emitted from said first portion during the thermal plankton concentration step (b) and reinserting the gasses in the thermal plankton concentrate.

3. The process of claim 1, further comprising the step of adding an additional amount of thermal plankton concentrate to the sterilized thermal water to obtain a super-activated thermal water having a thermal plankton population in excess of said predetermined population.

4. The process for regenerating thermal waters according to claim 1, further comprising the step of storing said thermal plankton concentrate for use to later regenerate polluted thermal water when regeneration is needed.

5. The process of claim 1, wherein said thermal liquid is separated from said first portion by at least one of centrifugation, micro filtration and reverse osmosis.

* * * * *